US007464882B2

(12) United States Patent
Kanamori

(10) Patent No.: US 7,464,882 B2

(45) Date of Patent: Dec. 16, 2008

(54) FLUID INJECTION VALVE

(75) Inventor: Hiroyasu Kanamori, Nagoya (JP)

(73) Assignee: Denso Corporation (JP)

( * ) Notice: Subject to any disclaimer, the term of this patent is extended or adjusted under 35 U.S.C. 154(b) by 243 days.

(21) Appl. No.: 11/339,475

(22) Filed: Jan. 26, 2006

(65) Prior Publication Data

US 2006/0169803 A1 Aug. 3, 2006

(30) Foreign Application Priority Data

Jan. 31, 2005 (JP) ............................. 2005-023082

(51) Int. Cl.
*F02M 41/16* (2006.01)
*F02M 47/02* (2006.01)
*B29C 45/20* (2006.01)

(52) U.S. Cl. ............................. 239/96; 239/86; 239/87; 239/569; 239/584; 239/88; 239/89; 239/90; 239/91; 239/92

(58) Field of Classification Search ................... 239/86, 239/87, 96, 569, 584, 88–92, 124, 533.2, 239/533.9, 585.1, 585.5, 555, 596
See application file for complete search history.

(56) References Cited

U.S. PATENT DOCUMENTS 2,084,057 A * 6/1937 French ........................ 239/90
2,786,487 A * 3/1957 Paulsen ................. 137/625.36
3,833,015 A * 9/1974 Kneuer ....................... 137/334
4,094,465 A 6/1978 Bastenhof
4,244,342 A * 1/1981 Fenne ........................ 123/501
4,394,856 A * 7/1983 Smith et al. ................. 123/506
4,427,151 A * 1/1984 Trenne ........................ 239/87
4,436,247 A * 3/1984 Akagi ......................... 239/86
4,955,340 A * 9/1990 Elliott ........................ 123/297
5,799,871 A * 9/1998 Theurer ......................... 239/1
6,027,037 A * 2/2000 Murakami et al. ............ 239/88
6,065,692 A * 5/2000 Brinn, Jr. ............... 239/533.12
6,170,757 B1 * 1/2001 Herrmann et al. ............. 239/88
6,357,677 B1 * 3/2002 Ren et al. ................ 239/585.4
6,394,418 B1 * 5/2002 Duan et al. .............. 251/335.3

(Continued)

FOREIGN PATENT DOCUMENTS

EP 1 165 961 B1 9/2002

(Continued)

OTHER PUBLICATIONS

Chinese Office Action dated Aug. 3, 2007 in Application No. 200610008907.8 with English translation.

(Continued)

*Primary Examiner*—Len Tran
*Assistant Examiner*—Steven Cernoch
(74) *Attorney, Agent, or Firm*—Nixon & Vanderhye PC

(57) ABSTRACT

The fluid injection valve has a first and second valve bodies fastened to each other, to bring a first end face of the first valve body into an intimate contact with a second end face of the second valve body. A first fluid passage in the first valve body is communicated with a second fluid passage in the second valve body. The first end face has a first depressed portion thereon, and the second end face has a second depressed portion thereon to be communicated with the first depressed portion to form a cavity to surround the first and second fluid passages.

13 Claims, 5 Drawing Sheets

U.S. PATENT DOCUMENTS

| | | | | |
|---|---|---|---|---|
| 6,460,775 | B1 * | 10/2002 | Duan et al. | 239/11 |
| 6,802,298 | B2 * | 10/2004 | Yoshimura et al. | 123/467 |
| 6,840,466 | B2 * | 1/2005 | Igashira et al. | 239/585.1 |
| 6,871,803 | B1 * | 3/2005 | Ohmi et al. | 239/596 |
| 2002/0079385 | A1 * | 6/2002 | Ibrahim et al. | 239/533.2 |
| 2004/0149264 | A1 * | 8/2004 | Pecheny et al. | 123/446 |
| 2005/0001071 | A1 | 1/2005 | Hashimoto et al. | |

FOREIGN PATENT DOCUMENTS

| | | | |
|---|---|---|---|
| JP | 2003-97389 | | 4/2003 |
| JP | 2003-329138 | | 11/2003 |
| WO | 00/60233 | | 10/2000 |
| WO | WO 03/038274 | A1 * | 5/2003 |

OTHER PUBLICATIONS

Chinese Office Action dated Feb. 1, 2008, issued in Application No. 200610008907.8, with English translation.

Japanese Official Action dated Aug. 26, 2008, issued in counterpart Japanese Application No. 2005-23082 with partial translation.

* cited by examiner

FLUID INJECTION VALVE

CROSS REFERENCE TO RELATED APPLICATION

This application is based upon and claims the benefit of priority of Japanese Patent Application No. 2005-023082 filed on Jan. 31, 2005, the content of which is incorporated herein by reference.

FIELD OF THE INVENTION

The present invention relates to a fluid injection valve suitably incorporated in a fuel injection system for an internal combustion engine, such as a common rail fuel injection system.

BACKGROUND OF THE INVENTION

A common rail fuel injection apparatus is known, which has a common rail commonly used to the cylinders to accumulate high-pressure fuel therein. A fuel supply pump pressure-feeds the fuel to the common rail, and the pressure of the fuel in the common rail is controlled to be a predetermined value. The fuel is injected into the cylinders by driving the injectors on the cylinders at specific timings. In general, the injector for the common rail fuel injection system has a construction to increase and decrease the pressure in a control chamber by actuating a control valve with an actuator, to lift up and down a nozzle needle to open and close an injection hole.

In the injector body, that is, in the body of the injector is formed a high-pressure fuel passage to supply the high pressure fuel from the common rail through a plurality of body members of the injector body to the control chamber and to the injection hole. Thus, it is necessary to secure a sealing performance at intimate contact end faces of the body members. As a general method to securely seal the intimate contact end faces, the end faces of the body members of the injector are processed by finish machining to be flat. The body members are stacked in a longitudinal direction of the injector, and brought into intimate contact with each other by an axial force by a fastening nut, to seal the intimate contact end faces.

However, the above-mentioned method has an issue that quite large axial force is necessary when the sealing pressure is high, and even slight error in the finishing accuracy on the end surface may cause leakage of the fuel. U.S. Pat. No. 4,094,465 discloses an injector having a leakage fuel collection passage for collecting a leakage fuel leaked at the end faces. The leakage fuel collection passage is connected to the fuel return passage to collect the leakage fuel, and arranged to isolate other passages so that the leakage fuel does not flow into other passages.

Further, WO-00-60233-A1 discloses another injector to form a sealing surface. Specifically, an end face of one body member has a flat shape, and an end face of the other body member, which is to be in contact with the one body member, has a depression thereon. Thus, only the end face without the depression forms the sealing surface. The leakage fuel leaked on the sealing surface is collected by a fuel return passage that opens on the end face having the depression.

FIG. 5 schematically depicts the construction of this kind of the injector for the common rail fuel injection system. The injector has: a body member 101 that installs an actuator therein; a plate member 102; a valve body 103 that forms a control valve portion; and a nozzle body 104 that forms an injection nozzle body 104. The body member 101, the plate member 102, the valve body 103 and the injection nozzle body 104 are stacked in a longitudinal direction of the injector, and inserted into a nut 105 to screw-fasten a screw thread 106 to the nut 105 to be one body. Thus, the end faces of the body member 101, the plate member 102, the valve body 103 and the injection nozzle body 104 are brought into intimate contact with each other to be sealed. FIGS. 6A and 6B depict an upper end face of the valve body 103 and a lower end face of the plate member 102 that are in contact with each other. On an approximately entire area on the upper end face of the valve body 103, except an outer circumferential portion 116, a periphery of the high-pressure fuel passage 107 and a periphery of the control pressure passage 108 connected to the injection hole, is formed a depressed portion 109. A low-pressure passage 110 opens to the depressed portion 109.

When the upper end face of the valve body 103 is abutted against the lower end face of the plate member 102, the outer circumferential portion 116 and an annular surface 111 around the high-pressure fuel passage 107 and the control pressure passage 108 on the upper end face of the valve body 103 come in intimate contact with the flat shaped lower end face of the plate member 102. Thus, the high-pressure fuel passage 107 and the low-pressure passage 110 are respectively formed to be continuous passages, the control pressure passage 108 is communicated with a low-pressure passage 113 on the plate member 102. Accordingly, a valve 112, which is installed in the control pressure passage 108, comes in contact with a piston 114, which is installed in the low-pressure passage 113. In FIGS. 6A and 6B, the referential numeral 115 denotes positioning pin holes.

However, in the above-mentioned structure of the conventional injector, the depressed portion 109, which is formed on one of two end faces to come in contact with each other, is under severe design constraint. Especially, the fuel injection pressure is increasing in recent years, so that it is necessary to form a sealing surface to surround the high pressure fuel passage (the annular surface 111 in FIG. 6) with a width of specific length or more, to secure a sealing performance of the high-pressure fuel passage. However, according to this construction, a space between the annular surface 111 surrounding the high-pressure fuel passage 107 and the outer circumferential portion 116 of the valve body 103 is formed to be a quite narrow groove 117, which cannot be easily processed.

This issue occurs on every contact faces between the body members (the body member 101, the plate member 102, the valve body 103 and the injection nozzle body 104) of the injector. In order to form the depressed portion 109 to avoid the many fuel passages required in the injector, it is necessary to form a part of the depressed portion 109 in a quite narrow or complicated shape. This causes an issue to increase man hour to manufacture and manufacturing cost of the injector.

SUMMARY OF THE INVENTION

The present invention, in view of the above-described issue, has an object to provide a fluid injection valve with high performance at low cost that can improve both sealing performance and processing workability on intimate contact end faces between a plurality of body members of the fluid injection valve.

The fluid injection valve has: a first valve body that has a first fluid passage formed therethrough approximately in a longitudinal direction of the valve body, a first end face provided on one end thereof in the longitudinal direction, and a first depressed portion formed on the first end face beside an opening of the first fluid passage on the first end face; and a second valve body that has a second fluid passage formed therethrough approximately in a longitudinal direction of the valve body, a second end face provided on one end thereof in the longitudinal direction, and a second depressed portion formed on the second end face beside an opening of the first fluid passage on the second end face, the second valve body being fastened to the first valve body in the longitudinal direction to bring the second end face into an intimate contact with the first end face, the second fluid passage being communicated with the first fluid passage, and the second depressed portion being communicated with the first depressed portion to form a cavity.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1A:
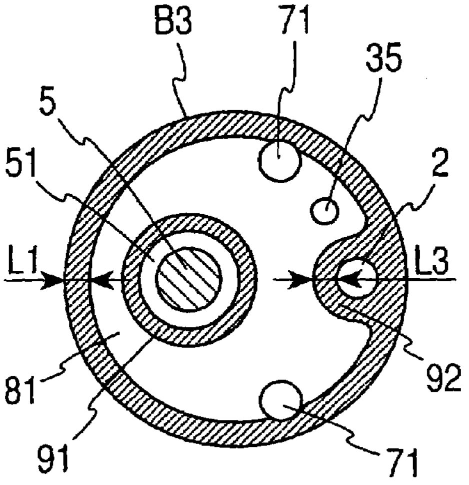
FIG. 1A is a cross-sectional view showing a fluid injection valve according to a first embodiment of the present invention, taken along a line IA-IA in FIG. 2.

A first embodiment of the present invention will be described in the following with references to the drawings. A fuel injector I according to the first embodiment is applied in a common rail fuel injection system for a diesel engine. FIG. 2 depicts an entire construction of an injector I, which is the fluid injection valve according to the first embodiment. FIGS. 1A-1D are cross-sectional views of the injector I respectively taken along lines IA-IA, IB-IB, IC-IC, ID-ID in FIG. 2. As shown in FIG. 2, the injector I is provided with: an injector body B1 and an plate member B2 that form a driving portion 11; a valve body B3 that forms a control valve portion 12; and a nozzle body B4 that forms an injection nozzle portion 13. The injector body B1, the plate member B2, the valve body B3 and the nozzle body B4 are sequentially stacked in a longitudinal direction of the injector, and a inserted into and oil-tightly screw-fastened by a nut B5. The injector I is mounted on a cylinder head (not shown) of an engine. The driving portion 11 drives the control valve portion 12, to inject fuel from the injection nozzle portion 13 into a corresponding cylinder of the engine.

In the injector I is formed a high-pressure fuel passage 2 for supplying fuel along the vertical direction in FIG. 2. The high-pressure fuel passage 2 is communicated via a fuel inlet port 21, which opens on a side face of an upper portion of the injector body B1, to an outer common rail (not shown). The common rail accumulates the fuel, which is pressure-fed by a high-pressure supply pump, at a predetermined degree of high pressure corresponding to injection pressure. In the injector I is further formed a low-pressure passage 3 for collecting the fuel along the vertical direction in FIG. 2. The low-pressure passage is communicated via a fuel outlet port 31, which opens on an upper end face of the injector body B1, and a fuel return passage (not shown) to a fuel tank (not shown). In FIG. 2, the passages are displaced to show every passage in the injector I.

In the driving portion 11, a hydraulic pressure transmission device 4 transmits a driving force of a piezoelectric actuator P to a valve 5 in the control valve portion 12. The piezoelectric actuator P is installed in an upper portion of a longitudinal hole formed in the injector body B1, and the hydraulic pressure transmission device 4 is installed in a lower portion of the longitudinal hole formed in the injector body B1. The piezoelectric actuator P has a conventional structure including a piezostack in which piezo-ceramic layers such as lead zirconate titanate (PZT) and electrode layers are alternately stacked. The piezoelectric actuator P extends and shrinks in the stacking direction of the layers (vertical direction in FIG. 2) and is charged and discharged by a driving circuit (not shown).

The hydraulic pressure transmission device 4 is provided with: a large diameter piston 41 and a small diameter piston 42 slidably installed in a cylinder; and an oil-tight chamber 43 defined by a lower end face of the large diameter piston 41, an upper end face of the small diameter piston 42 and the cylinder and filled with a hydraulic oil. An upper end portion of the large diameter piston 41 protrudes upward from the cylinder to be in contact with a lower end portion of a piston member P1 installed on a lower side of the piezoelectric actuator P. Thus, the large diameter piston 41 moves in a longitudinal direction of the cylinder integrally with the piezoelectric actuator P, in accordance with an extension and shrinkage of the piezoelectric actuator P. The upper end portion of the large diameter piston 41 and the longitudinal hole defines a ring-shaped space, in which a piezo spring P2 is installed to apply a predetermined magnitude of initial load to the piezoelectric actuator P. A passage 32 communicates the ring-shaped space with the low-pressure passage 3.

The oil-tight chamber 43 installs a valve spring 44 therein to urge the small diameter piston 42 downward. A pin-shaped lower portion of the small diameter piston 42 extends downward through a low-pressure port 33, which is formed in the plate member B2, to be in contact with an upper end face of the valve 5 of the control valve portion 12. Thus, when the piezoelectric actuator P extends to push the large diameter piston 41 downward, the oil-tight chamber 43 transforms the pushing force by the piezoelectric actuator P into hydraulic pressure, and transmitted to the small diameter piston 42 to boost the magnitude of the pushing force by the piezoelectric actuator P. By using the hydraulic pressure transmission device 4, a displacement of the piezoelectric actuator P is expanded in accordance with an area ratio of the large diameter piston 41 to the small diameter piston 42. A detailed construction of the control valve portion 12 will be given later.

In the injection nozzle portion 13, a cylinder formed in the nozzle body B4 slidably supports a nozzle needle 6 having a stepped profile in its longitudinal direction. The nozzle body B4 further has an oil accumulating chamber 62 to surround a lower small diameter portion of the nozzle needle 6. The high-pressure fuel passage 2 opens on a sidewall of the oil accumulating chamber 62 to supply the high pressure fuel from the common rail to the oil accumulating chamber 62. The nozzle body B4 further has a sac portion 63 at its lower portion. Injection holes 64 are formed to penetrate a sidewall of the sac portion 63. When the nozzle needle 6 lifts up to communicate the oil accumulating chamber 62 with the sac portion 63, the fuel is injected out of the injection holes 64.

An upper end face of the nozzle needle 6 and an inner face of the cylinder, which slidably supports the nozzle needle 6, define a space of a control chamber 61 for controlling backpressure of the nozzle needle 6. A control pressure passage 52, which is communicated with the control valve portion 12, supplies fuel to the control chamber 61 as hydraulic oil, to generate the backpressure of the nozzle needle 6. Further, a high-pressure passage 22 communicates the control chamber 61 at all times with the high-pressure fuel passage 2. The hydraulic force of the control chamber 61 acts on the nozzle needle 6 downward, to urge the nozzle needle 6 in a valve closing direction together with a spring 65 installed in the control chamber 61. The high pressure fuel in the oil accumulating chamber 62 urges the nozzle needle 6 upward in a valve opening direction.

The control valve portion 12 has the valve 5 with a three-way valve construction. A control valve room 51, which is a part of the control pressure passage, is formed in an upper portion of the valve body B3, to install a large diameter valve portion at an upper end portion of the valve 5 therein. An upper end face of the control valve room 51 is connected to the low-pressure port 33, and a lower end face of the control valve room 51 is connected to a high-pressure port 23 communicated with the high-pressure fuel passage 2. The control pressure passage 52 communicates the control valve room 51 with the control chamber 61 of the injection nozzle portion 13 at all times. A low-pressure passage 34 communicates the low-pressure port 33 with the low-pressure passage 3, and a high-pressure passage 24 communicates the high-pressure port 23 with the high-pressure fuel passage 2. The valve 5 communicates the control valve room 51 selectively to the low-pressure port 33 or to the high-pressure port 23 in accordance with a seating position of the valve 5.

A piston-shaped lower portion of the valve 5 slides in a cylinder formed in the valve body B3, and is urged upward by a spring 53 installed in a spring room 54, which is a lower end portion of the cylinder formed in the valve body B3. A low-pressure passage 35, which is formed in the valve body B3, and a low-pressure passage 36, which is formed in the plate member B2, communicates the spring room 54 with the low-pressure passage 3. When the valve 5 moves downward in the cylinder formed in the valve body B3, the low-pressure passages 35, 36 formed in the valve body B3 discharge the fuel in the spring room 54 outward, to smooth a valve opening motion of the valve 5. Further, a low-pressure passage 37 is connected to the spring room 54 to collect leakage fuel from the injection nozzle portion 13.

In accordance with as switching operation of the seating position of the valve 5 in the driving portion 11, the backpressure of the nozzle needle 6, that is, the pressure in the control valve room 51 and the control chamber 61, which is communicated with the control valve room 51, increases and decreases. When the piezoelectric actuator P is discharged to be shrunk, the valve 5 is positioned at an upper end position to close the low-pressure port 33. In this time, the high-pressure port 23 is open, so that the high pressure fuel in the high-pressure fuel passage 2 flows through the control pressure passage 52 into the control chamber 61. The pressure in the control chamber 61 and an urging force of the spring 65 positions the nozzle needle 6 at its valve closing position, to interrupt a communication between the injection holes 64 and the oil accumulating chamber 62.

In this state, when the piezoelectric actuator P is energized to be extended, the hydraulic pressure transmission device 4 transmits a driving force of the piezoelectric actuator P, to push the small diameter piston 42 and the valve 5 downward. In FIG. 2, the valve 5 is shown at a lower end position, to open the low-pressure port 33 to discharge the fuel in the control chamber 61 through the control pressure passage 52 to the low-pressure passage 3. Thus, the pressure in the control chamber 61 decreases, to position the nozzle needle 6 at its valve opening position, and the fuel is injected out of the injection holes 64.

In the following is described an intimate contact structure between the injector body B1, the plate member B2, the valve body B3 and the nozzle body B4, referring to FIGS. 1A-1D. FIGS. 1A and 1B symmetrically depict an upper end of the plate member B2 and a lower end face of the valve body B3, which are in the intimate contact with each other. The high-pressure fuel passage 2 symmetrically opens on the upper end face of the valve body B3 and on the lower end face of the plate member B2. Further, the low-pressure passage 35 opens on the upper end face of the valve body B3, and the low-pressure passage 36 opens on the lower end face of the plate member B2. Furthermore, the low-pressure port 33 opens on the lower end face of the plate member B2 so as to face the control pressure chamber that opens on the upper end face of the valve body B3.

On an outer circumferential portion of the upper end face of the valve body B3 are formed two positioning pin holes 71. Corresponding with the positioning pin holes 71, on an outer circumferential portion of the lower end face of the plate member B2 are formed two positioning pin holes 72. By connecting the end faces of the plate member B2 and the valve body B3 to fit the positioning pin holes 71 on the valve body B3 to the positioning pin holes 72 on the plate member B2 with positioning pins (not shown), the high-pressure fuel passage 2, the low-pressure passage 35 and the low-pressure passage 36 are communicated to be a continuous passage, and the control valve room 51 is communicated with the low-pressure port 33, as shown in FIG. 2.

In the present embodiment, the upper end face of valve body B3 and the lower end face of the plate member B2 have a depression and a groove, to decrease a contact area to increase the pressure on the contact faces. The depression and the groove are disposed to avoid a peripheral portion of an opening of high-pressure fuel passages. The depression and the groove are communicated with each other. The high pressure fuel passages includes the high-pressure fuel passage 2 to supply the high pressure fuel to the injection holes 64, the control pressure passage 52 (the control valve room 51) to flow the fuel at control pressure, etc. In the present embodiment, on the upper end face of the valve body B3 is formed a depressed portion 81 that has an approximately circular circumferential shape and a predetermined depth to avoid: the outer circumferential portion of the upper end face; a sealing surface 91 that has a predetermined width and surrounds an opening portion of the high-pressure fuel passage 2; and a sealing surface 92 that has a predetermined width and surrounds an opening portion of the control valve room 51 forming the control pressure passage. The low-pressure passage 35, which is a low-pressure fuel passage, opens to the depressed portion 81.

On the lower end face of the plate member B2 is formed a ring-shaped groove (depressed portion) 82 that has a predetermined width to be coaxial to the plate member B2 and a diameter slightly smaller than a diameter of the plate member B2 to approximately overlap with an outer circumference of the depressed portion 81. The lower end face of the plate member B2 is flat except for the ring-shaped groove 82. Thus, when the plate member B2 is abutted against the valve body B3, the outer circumferential portion and the sealing faces 91, 92 of the valve body B3 come in intimate contact with the flat face of the plate member B2. Further, the depressed portion 81 is communicated with the ring-shaped groove 82, to form a small cavity that surrounds the high-pressure fuel passage 2 and the control valve room 51 to provide a predetermined thickness of wall between the small cavity and the high-pressure fuel passage 2 or the control valve room 51.

The small cavity increases surface pressure on the sealing surfaces of the valve body B3 and the plate member B2, to improve sealing performance at the sealing surfaces. Further, the small cavity is communicated with the low-pressure passages 35, 36 to form a fuel collection passage to collect leakage fuel leaked from the high-pressure fuel passage 2 and the control valve room 51 at the sealing faces 91, 92. Thus, it is possible to collect and discharge the leakage fuel rapidly through the low-pressure passages 35, 36 and the low-pressure passage 3.

Figure 1C:
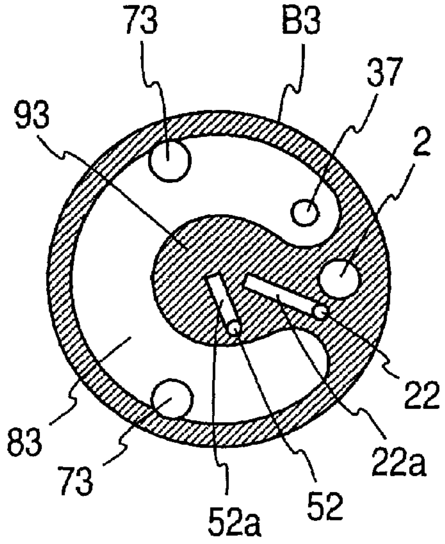
FIG. 1C is still another cross-sectional view showing a fluid injection valve according to the first embodiment, taken along a line IC-IC in FIG. 2.
Figure 1B:
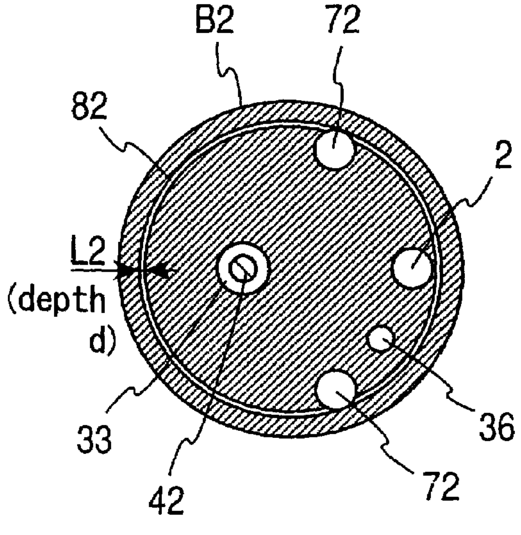
FIG. 1B is another cross-sectional view showing the fluid injection valve according to the first embodiment, taken along a line IB-IB in FIG. 2.
Figure 1D:
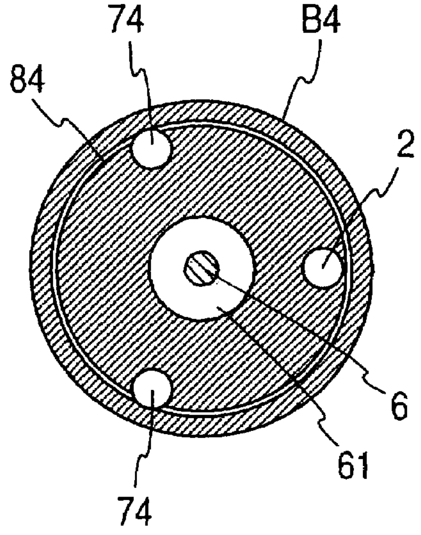
FIG. 1D is still another cross-sectional view showing a fluid injection valve according to the first embodiment, taken along a line ID-ID in FIG. 2.
Figure 2:
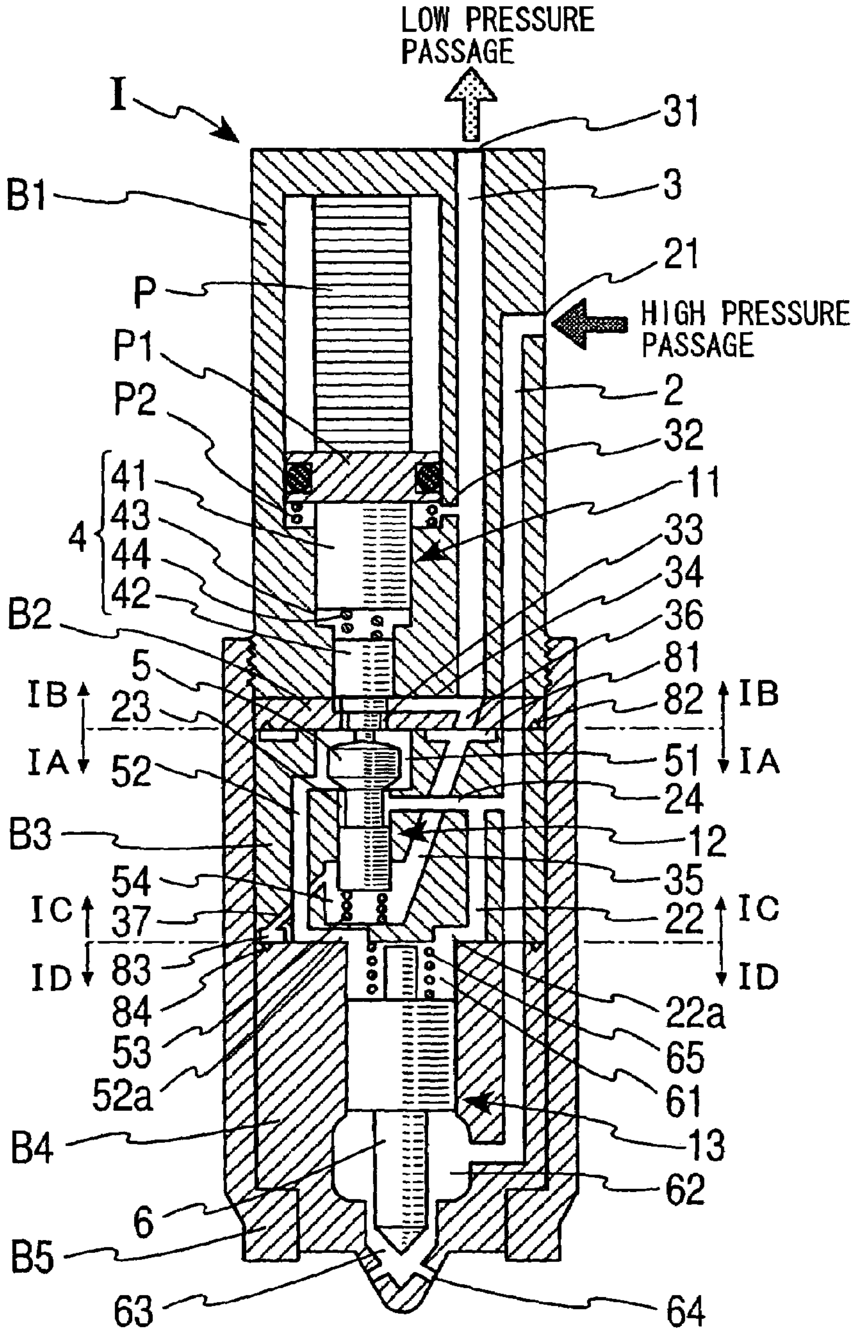
FIG. 2 is a cross-sectional view showing an entire construction of the fuel injection valve according to the first embodiment.

FIGS. 1C and 1D symmetrically depict a lower end of the valve body B3 and an upper end face of the nozzle body B4, which are in the intimate contact with each other. The high-pressure fuel passage 2 symmetrically opens on the lower end face of the valve body B3 and on the upper end face of the nozzle body B4. On a center portion of the lower end face of the valve body B3 are formed a groove 52*a*, which forms the control pressure passage 52, and a groove 22*a*, which forms the high-pressure passage 22. On an outer circumferential portion of the lower end face of the valve body B3 opens the low-pressure passage 37. On a center portion of the upper end portion of the nozzle body B4 opens the control chamber 61.

On the outer circumferential portion of the lower end face of the valve body B3 are formed two positioning pin holes 73. Corresponding with the positioning pin holes 73, on an outer circumferential portion of the upper end face of the nozzle body B4 are formed two positioning pin holes 74. Further, on the lower end face of the valve body B3 is formed a depressed portion 83 that is approximately C-shaped and has a predetermined depth, to avoid: the outer circumferential portion of the lower end face; and a sealing surface 93 that has a predetermined width and surrounds the high-pressure fuel passage 2, the control pressure passage 52 and the high-pressure passage 22. The low-pressure passage 37 opens to the depressed portion 83. On the upper end face of the nozzle body B4 is formed a ring-shaped groove 84 that has a predetermined width to be coaxial to the nozzle body B4 and a diameter slightly smaller than a diameter of the nozzle body B4 to approximately overlap with an outer circumference of the depressed portion 83. The upper end face of the nozzle body B4 is flat except for the ring-shaped groove 84.

Thus, by connecting the end faces of the valve body B3 and the nozzle body B4 to fit the positioning pin holes 73 on the valve body B3 to the positioning pin holes 74 on the nozzle body B4 with positioning pins (not shown), the high-pressure fuel passage 2 is continuously formed, and the control chamber 61, the control pressure passage 52 and the high-pressure passage 22 are communicated to be a continuous passage, as shown in FIG. 2. Further, the depressed portion 83 is communicated with the ring-shaped groove 84, to form a small cavity that surrounds the high-pressure fuel passage 2, the control chamber 61, the control pressure passage 52 and the high-pressure passage 22 to provide a predetermined thickness of wall between the small cavity and high-pressure fuel passage 2, the control chamber 61, the control pressure passage 52 or the high-pressure passage 22.

The small cavity increases surface pressure on the sealing surfaces of the valve body B3 and the nozzle body B4, to improve sealing performance at the sealing surfaces. The small cavity also serves as a fuel collection passage to collect leakage fuel leaked from highly pressured portions at the sealing surface 93.

Further, according to the present invention, it is possible to form the small cavity quite easily. In the aforementioned conventional structure shown in FIGS. 5, 6A and 6B, the depressed portion 109 is formed only on the side of the valve body 103. Accordingly, it is necessary to form a quite narrow groove 117 between the outer circumferential portion of the valve body 103 and the annular surface 111 around the high-pressure fuel passage 107, which serve as the sealing surface. In this construction, the width of the narrow groove 117 limits the kind of cutting tool for forming the depressed portion 109 at the width of the narrow groove 117, so that the workability to form the fluid injection valve is seriously decreased.

In this regard, such the small cavity as shown in FIGS. 1A and 1B is formed from the depressed portion 81 on the valve body B3 and the ring-shaped groove 82 on the plate member B2, so that the small cavity has a flexibility in its shape. That is, it is possible to realize a construction equivalent to the aforementioned conventional construction without forming the narrow groove 117 on the valve body B3 and by forming a groove on the plate member B2, which faces the valve body B3. In this case, it is possible to greatly decrease a total machining time by specifying the depressed portion 81 on the valve body B3 to a shape that can be processed only by a large cutting tool and by processing the ring-shaped groove 82 coaxially to the plate member B2 with a lathe.

This advantage is ditto for the small cavity shown in FIGS. 1C and 1D. it is possible to improve a workability of the injector I by specifying the depressed portion 83 on the valve body B3 to a shape that can be processed only by a large cutting tool and by processing the ring-shaped groove 84 coaxially to the plate member B2 with an lathe.

In the present embodiment, the width of the sealing surface in the radial direction of the injector I, the width, depth, etc. of the depressed portions 81, 83 and the grooves 82, 84 can be selected as appropriate to derive required performances in view of necessary surface pressure, processing workability, and so on. For example, the width of the sealing surface, which is formed around the outer circumferential portion of the valve body B3, (the distance between the outer circumference of the valve body B3 and the depressed portion 81) is ordinarily set to around 0.5 mm to 1 mm in the radial direction. It is ordinarily desirable that the width L of the ring-shaped groove 82 is set to around 0.03 mm to 0.1 mm, and the depth d of the ring-shaped groove 82 is set to around 0.03 mm to 0.1 mm. It is desirable that the width of the sealing surface 92 around the high-pressure fuel passage 2 is around 1 mm to 1.5 mm in the radial direction. These values are based on the dimension after the finishing process. Further, it is desirable that the width of the depressed portion 81 (cutting portion except the groove), so as to be processed by large cutting tool. The depth of the depressed portion 81 may be set to around 0.01 mm to 1 mm, in view of the processing workability. The dimensions of the depressed portions and the grooves on the intimate contact end faces of the other members of the injector I can be selected in the same fashion.

Second Embodiment

Figure 3:
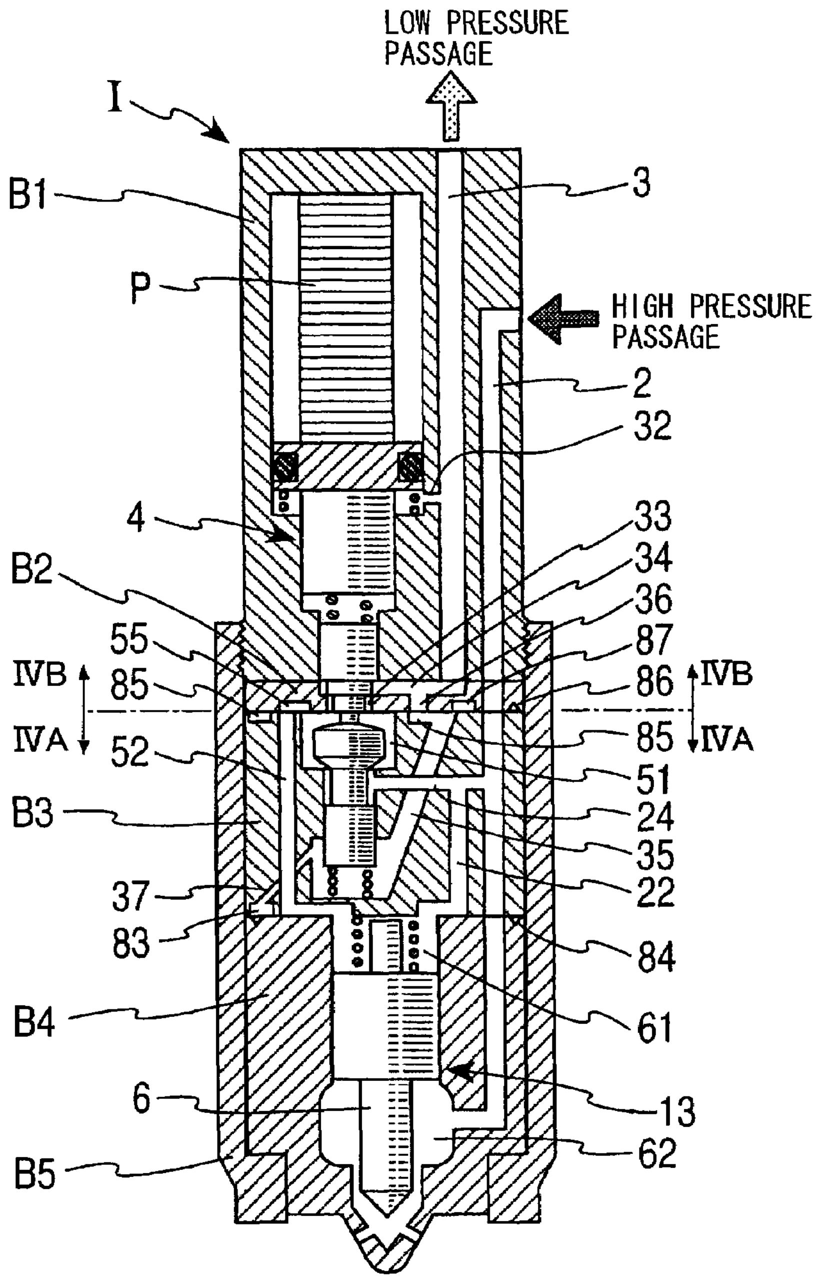
FIG. 3 is a cross-sectional view showing an entire construction of a fuel injection valve according to a second embodiment of the present invention.
Figure 4A:
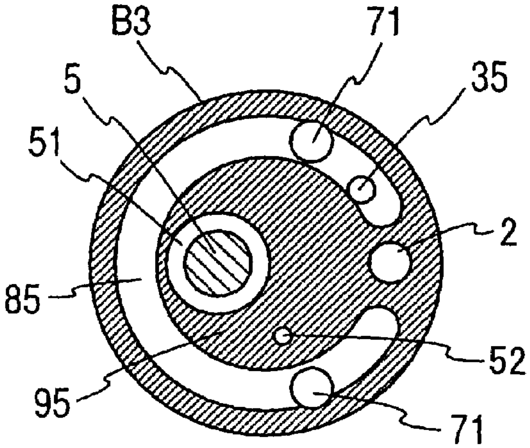
FIG. 4A is a cross-sectional view showing the fluid injection valve according to the second embodiment, taken along a line IVA-IVA in FIG. 3.
Figure 4B:
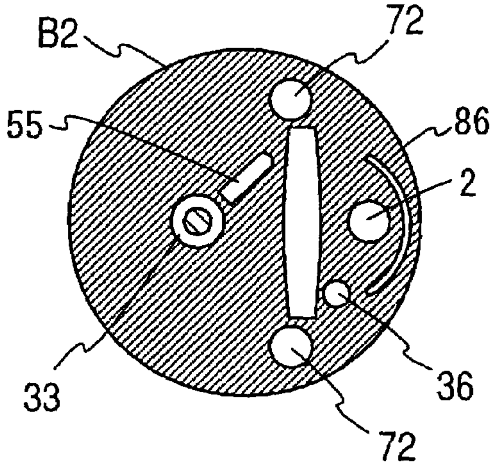
FIG. 4B is another cross-sectional view showing the fluid injection valve according to the second embodiment, taken along a line IVB-IVB in FIG. 3.
Figure 5:
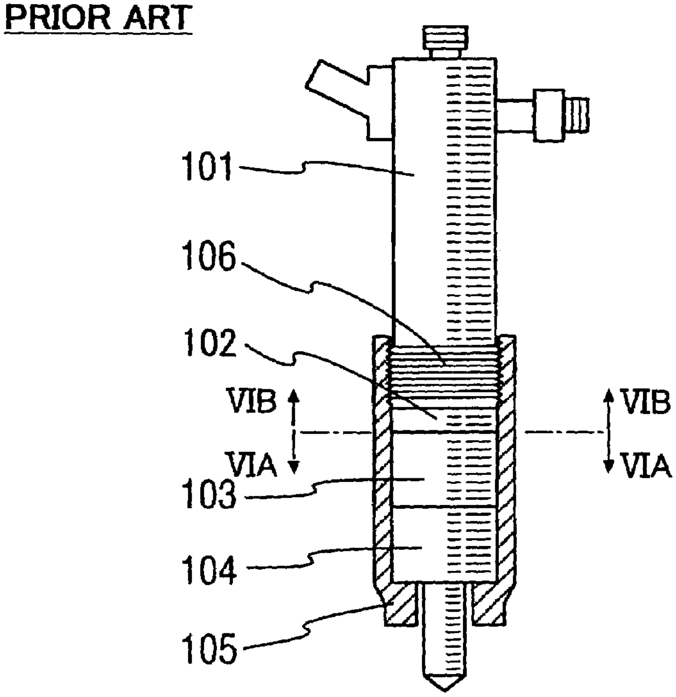
FIG. 5 PRIOR ART
FIG. 5 is a cross-sectional view showing an entire construction of a conventional fuel injection valve.
Figure 6A:
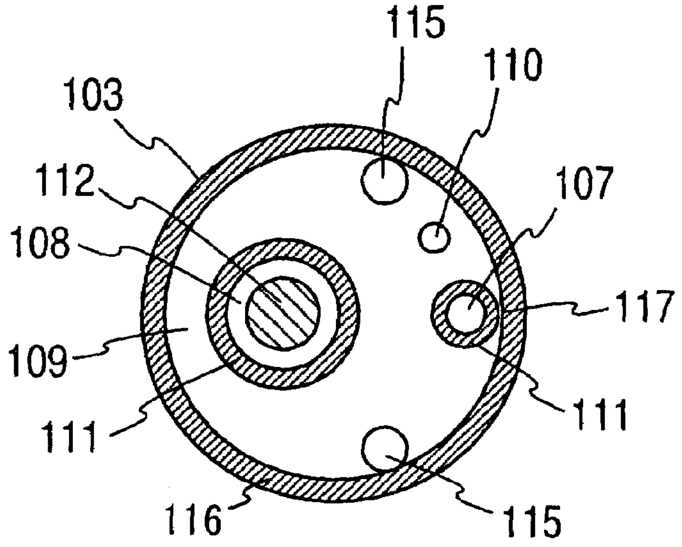
FIG. 6A PRIOR ART
FIG. 6A is a cross-sectional view showing the conventional fluid injection valve, taken along a line VIA-VIA in FIG. 5.
Figure 6B:
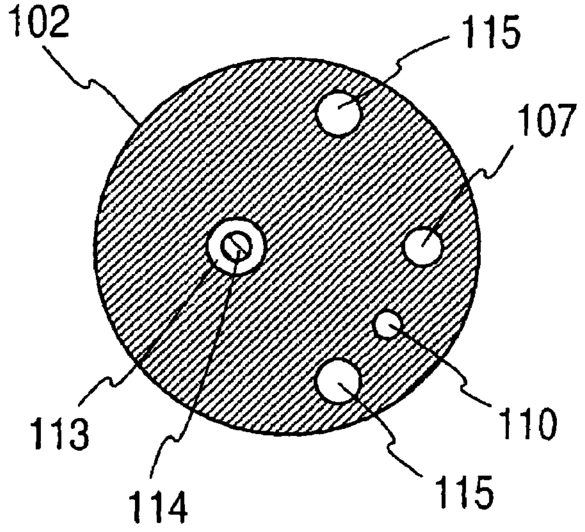
FIG. 6B PRIOR ART
FIG. 6B is another cross-sectional view showing the conventional fluid injection valve, taken along a line VIB-VIB in FIG. 5.

FIGS. 4A, 4B and 5 depict the injector I according to a second embodiment of the present invention. The shapes and combinations of the depressed portions and the grooves forming the small cavity are not limited to those in the first embodiment, and may be modified as appropriate in accordance with the construction of each part of the injector I and other factors. As shown in FIG. 3, in the present embodiment, the control pressure passage 52, which is communicated with the control chamber 61, is not connected to the control valve room 51 in the valve body B3, but opens on the upper end face of the valve body B3 and communicated with the control valve room 51 by a narrow groove 55 formed on a lower end face of the plate member B2. Further, the low-pressure passage 35 on the valve body B3 is communicated with the low-pressure passage 36 on the plate member B2 by a depressed portion 85, which is described in the following. The constructions of other parts of the injector I according to the present embodiment is equivalent to those of the injector I according to the first embodiment, and not especially described.

As shown in FIG. 5, the depressed portion 85 on the upper end face of the valve body B3 has a predetermined depth and is approximately C-shaped to avoid: the peripheries of the opening portion of the control valve room 51 and the control pressure passage 52; the high-pressure fuel passage 2; and the outer circumferential portion of the valve body B3. The low-pressure passage 35 opens on the depressed portion 85. On the lower end face of the plate member B2 is formed a depressed portion 87 with a specific width and approximately straight shape, so as to partition the high-pressure fuel passage 2 off the narrow groove 55, which is communicated with the control valve room 51 and the control pressure passage 52, and the low-pressure port 33. Further, on the lower end face of the plate member B2 is formed an approximately arc-shaped narrow groove (depressed portion) 86 to surround the high-pressure fuel passage 2 at its side of the outer circumference of the plate member B2.

Accordingly, by connecting the end faces of the plate member B2 and the valve body B3 to fit the positioning pin holes 71 on the valve body B3 to the positioning pin holes 72 on the plate member B2 with positioning pins (not shown), the high-pressure fuel passage 2, the high-pressure fuel passage 2 is continuously formed and the control valve room 51 and the control pressure passage 52 are communicated by the groove 55 on the sealing surfaces of the valve body B3 and the plate member B2. Further, the depressed portion 85, the depressed portion 87 and the narrow groove 86 are communicated with each other, to form: a small cavity that surrounds the high-pressure fuel passage 2 to provide a predetermined thickness of wall between the small cavity and the high-pressure fuel passage 2; and a small cavity that surrounds the control pressure passage including the control valve room 51, the control pressure passage 52 and the narrow groove 55 to provide a predetermined thickness of wall between the small cavity and the control pressure passage.

In this manner, it is possible to form a plurality of the small cavities respectively surrounding the high-pressure fuel passage for supplying the fuel and the control pressure passage, and to derive an effect equivalent to that in the first embodiment. The widths and depths of the depressed portion 85, the depressed portion 87 and the narrow groove 86 are determined as appropriate as described above. The construction of the injector I according to the present invention has the narrow groove 55 on the plate member B2, which is formed by electric discharge machining. Thus, by processing a part of the depressed portions and the grooves together with the narrow groove 55, specifically the narrow groove 86 in the present embodiment, it is possible to decrease a cutting processes and to decrease the total processing time. The depressed portion 85 on the valve body B3 has a shape that can be processed by large cutting tool, as in the first embodiment shown in FIG. 1A.

As described above, in the fluid injection valve according to the present invention, each end face of the body members of the fluid injection valve has the depressed portion or the groove at a portion to avoid the peripheries of high pressure fuel passages such as the high-pressure fuel passage 2, the control valve room 51 serving as the control pressure passage, to increase the surface pressure on the sealing surface. Then, the depressed portions or the grooves on the end faces are communicated with each other at the intimate contact end faces of the body members of the fluid injection valve, to form the small cavity. Thus, it is possible to improve both the sealing performance and processing workability, to realize a fluid injection valve with a high performance at low manufacturing cost.

In the above-described embodiment, the injector I has the piezoelectric actuator; however, the present invention is not limited to this construction. Alternatively, the fluid injection valve according to the present invention may use a solenoid actuator using a solenoid, or a magnetostrictive actuator using a magnetostrictive device that generates a displacement when energized as the piezoelectric actuator does. The valve may be one other than three-way valve. The constructions of the control valve portion, the injection nozzle portion, and other portions may be modified as appropriate.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid injection valve comprising:

a valve body that has:

- a first plurality of fluid passages formed therethrough approximately in a longitudinal direction of the valve body,
- first and second end faces respectively at each end of the valve body in the longitudinal direction, each end face including respective end openings of the first plurality of fluid passages, and
- a depressed portion formed on the first end face of the valve body, said first depressed portion being spaced from an outer circumference of the first end face to define an outer circumferential portion and being spaced from the openings of the first plurality of fluid passages to define a sealing surface functioning as a peripheral portion encircling the openings of the first plurality of fluid passages; and a plate member that has:

- a second plurality of fluid passages formed therethrough approximately in a longitudinal direction of the plate member,
- first and second end faces respectively at each end of the plate member in the longitudinal direction, each end face including respective end openings of the second plurality of fluid passages, and a depressed portion formed on the second end face of the plate member, said depressed portion being spaced from an outer circumference of the second end face to define an outer circumferential portion and being spaced from the openings of the second plurality of fluid passages to define a sealing surface functioning as a peripheral portion encircling the openings of the second plurality of fluid passages;

the plate member being fastened to the valve body in the longitudinal direction to bring the second end face of the plate member into an intimate contact with the first end face of the valve body, the second plurality of fluid passages being communicated with the first plurality of fluid passages, and a first cavity defined by the facing depressed portions of the first end face of the valve body and the second end face of the plate member, wherein the communicating first and second pluralities of fluid passages are substantially surrounded by the first cavity.

2. The fluid injection valve according to claim 1, further comprising a leaked fluid collection passage that opens to the first cavity.

3. The fluid injection valve according to claim 1, wherein at least one of the depressed portion of the first end face of the valve body and the depressed portion of the second end face of the plate member is a groove.

4. The fluid injection valve according to claim 1, wherein said depressed portion formed on the second end face of said plate member comprises a groove.

5. The fluid injection valve according to claim 4, wherein said a groove is an approximately arc-shaped narrow groove.

6. The fluid injection valve according to claim 4, wherein said groove is a ring-shaped groove.

7. The fluid injection valve according to claim 1, wherein:

one of the passages of each of the first and second pluralities of the passages is a high-pressure fluid supply passage that supplies high-pressure fluid from a base end portion to an injection nozzle portion of the fluid injection valve; and another passage of each of the first and second pluralities of the passages is a control pressure passage that flows a control fluid for controlling the injection nozzle portion.

8. The fluid injection valve according to claim 1, wherein an entire surface of the first end face of the valve body excluding the depressed portion thereon and the openings of the first plurality of fluid passages and an entire surface of the second end face of the plate member excluding the depressed portion thereon and the openings of the second plurality of fluid passages are respectively hermetically sealing surfaces that are in intimate contact with each other to seal a fluid in the first plurality of fluid passages and the second plurality of fluid passages.

9. The fluid injection valve according to claim 1, further comprising:

a nozzle body that has:

a third plurality of fluid passages formed therethrough approximately in a longitudinal direction of the nozzle body;

first and second end faces respectively at each end of the nozzle body in the longitudinal direction, each end face including respective end openings of the third plurality of fluid passages, and a depressed portion formed on the first end face of the nozzle body, said depressed portion being spaced from an outer circumference of the first end face to define an outer circumferential portion and being spaced from the openings of the third plurality of fluid passages to define a sealing surface functioning as a peripheral portion encircling the openings of the third plurality fluid passages; and the first valve body further has:

a depressed portion formed on the second end face thereof, said depressed portion being spaced from an outer circumference of the second end face to define an outer circumferential portion and being spaced from the openings of the first plurality of fluid passages to define a sealing surface functioning as a peripheral portion encircling the openings of the first plurality of fluid passages;

the nozzle body being fastened to the valve body in the longitudinal direction to bring the first end face of the nozzle body into an intimate contact with the second end face of the valve body, the third plurality of fluid passages being communicated with the first plurality of fluid passages, and a second cavity defined by the facing depressed portions of the second end face of the valve body and the first end face of the nozzle body, wherein the communicating first and third pluralities of fluid passages are substantially surrounded by the third cavity.

10. The fluid injection valve according to claim 9, wherein said depressed portion formed on the first end face of said nozzle body comprises a groove.

11. The fluid injection valve according to claim 10, wherein said groove is a ring-shaped groove.

12. The fluid injection valve according to claim 9, wherein:

one of the first and third pluralities of the passages is a high-pressure fluid supply passage that supplies high-pressure fluid from a base end portion to an injection nozzle portion of the fluid injection valve; and another of the first and third pluralities of the passages is a control pressure passage that flows a control fluid for controlling the injection nozzle portion.

13. The fluid injection valve according to claim 9, wherein an entire surface of the second end face of the valve body excluding the depressed portion thereon and the openings of the first plurality of fluid passages and an entire surface of the first end face of the nozzle member excluding the depressed portion thereon and the openings of the third plurality of fluid passages are respectively hermetically sealing surfaces that are in intimate contact with each other to seal a fluid in the first plurality of fluid passages and the third plurality of fluid passages.

* * * * *